US011898670B2

(12) United States Patent
Takahashi et al.

(10) Patent No.: US 11,898,670 B2
(45) Date of Patent: Feb. 13, 2024

(54) TUBE END MEMBER, FLANGE TUBE, BAND JOINT STRUCTURE FOR FLANGE TUBE, AND METHOD FOR MANUFACTURING TUBE END MEMBER

(71) Applicants: SANKEI GIKEN KOGYO CO., LTD., Tokyo (JP); VISTA CO., LTD., Shiraoka (JP)

(72) Inventors: Yoshiyuki Takahashi, Isesaki (JP); Hideaki Arai, Shiraoka (JP)

(73) Assignees: SANKEI GIKEN KOGYO CO., LTD., Tokyo (JP); VISTA CO., LTD., Saitama (JP)

( * ) Notice: Subject to any disclaimer, the term of this patent is extended or adjusted under 35 U.S.C. 154(b) by 210 days.

(21) Appl. No.: 17/598,156

(22) PCT Filed: Mar. 11, 2020

(86) PCT No.: PCT/JP2020/010516
§ 371 (c)(1),
(2) Date: Sep. 24, 2021

(87) PCT Pub. No.: WO2020/208994
PCT Pub. Date: Oct. 15, 2020

(65) Prior Publication Data
US 2022/0170576 A1 Jun. 2, 2022

(30) Foreign Application Priority Data

Apr. 9, 2019 (JP) .................................. 2019-074214

(51) Int. Cl.
*F16L 23/04* (2006.01)
*B21D 19/12* (2006.01)
(52) U.S. Cl.
CPC .............. *F16L 23/04* (2013.01); *B21D 19/12* (2013.01)

(58) Field of Classification Search
CPC . F16L 23/04; F16L 23/08; F16L 23/10; F16L 19/0286; B21D 19/12; B21D 19/16
(Continued)

(56) References Cited

U.S. PATENT DOCUMENTS 2,065,480 A * 12/1936 Soper
3,180,662 A * 4/1965 Parlasca .................. F16L 23/10
(Continued)

FOREIGN PATENT DOCUMENTS

JP 56-133914 U 10/1981
JP 63-280990 A 11/1988
(Continued)

OTHER PUBLICATIONS

International Search Report dated May 19, 2020, issued in counterpart International Application No. PCT/JP2020/010516. (2 pages).

*Primary Examiner* — William S. Choi
(74) *Attorney, Agent, or Firm* — WHDA, LLP

(57) ABSTRACT

A tube end member to be provided at an end of a flange tube includes a tubular part configured to be fitted to an end of a tube body of the flange tube, a flat part formed by bending an end of the tubular part outwards at a substantially right angle, in an opposite side to a fitting side of the tubular part to be fitted to the tube body, an extending part formed by bending an outer end of the flat part at a substantially right angle towards the tubular part, a tapered part extending at an angle from an edge of the extending part so as to approach the tubular part, and a folded-back part folded back from an edge of the tapered part into a space S enclosed by the tubular part, the flat part and the extending part. The folded-back part abuts on the tapered part.

7 Claims, 10 Drawing Sheets

(58) Field of Classification Search
USPC .................................................. 285/407, 365
See application file for complete search history.

(56) References Cited

U.S. PATENT DOCUMENTS

| | | |
|---|---|---|
| 4,822,083 A | 4/1989 | Meinig |
| 5,015,018 A * | 5/1991 | Arnoldt .................... F16L 23/08 |
| 7,004,512 B2 * | 2/2006 | Antonelli ....................... 285/407 |
| 7,425,023 B2 * | 9/2008 | Hartig ..................... F16L 23/08 |
| | | 285/365 |
| 2002/0094233 A1 * | 7/2002 | Price |
| 2008/0169649 A1 * | 7/2008 | Bruckner ....................... 285/365 |
| 2011/0005292 A1 * | 1/2011 | Futagi .................... B21D 19/12 |

FOREIGN PATENT DOCUMENTS

| | | |
|---|---|---|
| JP | 2003-13733 A | 1/2003 |
| JP | 2006-144871 A | 6/2006 |
| JP | 2017-74614 A | 4/2017 |
| WO | WO-2020066721 A1 * | 4/2020 |

* cited by examiner (A)

(B)

(C)

(A)

(B)

(C)

(D)

(A)

(B)

(A)

(B)    (C)

(D)

(A)

(B)

(C)

(D)

TUBE END MEMBER, FLANGE TUBE, BAND JOINT STRUCTURE FOR FLANGE TUBE, AND METHOD FOR MANUFACTURING TUBE END MEMBER

TECHNICAL FIELD

The present invention relates to a tube end member to be provided at an end of a flange tube for use as, for example, an exhaust component for a vehicle, the flange tube, and a band joint structure for the flange tube.

BACKGROUND ART

The band joint structure in the prior art is known, in which flange tubes are fastened to each other by a band formed in a substantially mountain shape in a sectional view. FIG. 9 shows a flange tube 11 serving as the flange tube to be used in the band joint structure. The flange tube 11 has a tube body 12 and a ring-shaped annular body 13 provided at an end of the tube body 12. The annular body 13 is configured as a flange including a flat surface 131 positioned outside in the axial direction of the tube body 12, and a tapered surface 132 positioned inside in the axial direction, and serves as a cutting member formed by cutting a ring-shaped intermediate member. An inner peripheral surface 133 of the annular body 13 is formed to have substantially the same diameter as the diameter of an outer peripheral surface 121 of the tube body 12, is fitted partially and externally on the outer peripheral surface 121 at the end of the tube body 12. The tube body 12 and the annular body 13 are fixed to each other by welding at a welded part 14 in the vicinity of the inner edge of the tapered surface 132. The one flange tube 11 and the other flange tube 11 are arranged so that the flat surfaces 131, 131 abut on each other, and a band 14 formed in a substantially mountain shape in a sectional view is attached so as to cover the one annular body 13 and the other annular body 13. The one flange tube 11 and the other flange tube 11 are then fastened by the band fastening tool 14.

FIG. 10 shows a flange tube 16 as another-type flange tube. The flange tube 16 includes a flange 18 formed by folding an end of a tube body 17. The flange 18 includes a flat part 181 positioned outside in the axial direction of the tube body 17, an extending part 182 which is folded inward in the axial direction of the tube body 17 from the flat part 181 so as to extend substantially parallel to an outer peripheral surface 171 of the tube body 17, and a tapered part 183 which extends at an angle from the edge of the extending part 182 so as to approach the outer peripheral surface 171. The one flange tube 16 and the other flange tube 16 are arranged so that the flat parts 181, 181 abut on each other, and a band fastening tool 19 formed in a substantially mountain shape in a sectional view is attached so as to cover the one flange 18 and the other flange 18. The one flange tube 16 and the other flange tube 16 are fastened by the band fastening tool 19.

It is noted that Patent Document 1 discloses a structure in which flange tubes are fastened by a band formed in a substantially mountain shape.

CITATION LIST

Patent Literature

[Patent Document 1] Japanese Patent Application Laid-Open Publication No. 2003-13733

SUMMARY OF INVENTION

Technical Problem

The flange tube 11 shown in FIG. 9 is configured with the annular body 13 as the flange which is formed by cutting a ring-shaped intermediate member of a block member made of metal such as stainless steel. Thus, the flange tube 11 has some problems of high material costs and high machining costs, a very long machining time, and inefficiency in manufacturing of the flange tube. The flange tube 11 has another problem in that the annular body 13 formed by cutting a block member is a solid member as a whole, and thus the annular body 13 and the flange tube 11 are heavy.

On the other hand, the flange tube 16 shown in FIG. 10 is configured with the flange 18 formed by carrying out folding-back to the end of the tube body 17. Accordingly, the flange tube 16 achieves low costs and less manufacturing time, but has, as another problem, difficulty in being formed with the accuracy required for the flat part 181 and the accuracy required for the tapered part 183, and in being maintained with the stable accuracy thereof, due to the completely hollow space enclosed by the flat part 181, the extending part 182 and the tapered part 183 of the flange 18.

The present invention, in view of the above problems, proposes and provides a tube end member for a flange tube which achieves low manufacturing costs, excellent manufacturing efficiency and light weight, and further ensures the accuracy required for a flat part and a tapered part of the flange of the flange tube and achieves the maintenance of the stable accuracy thereof, the flange tube including the tube end member, and a band joint structure for the flange tube.

Solution to Problem

The tube end member according to the present invention is to be provided at an end of a flange tube. The tube end member includes a tubular part configured to be fitted to an end of a tube body of the flange tube, a flat part formed by bending an end of the tubular part outwards at a substantially right angle, in an opposite side to a fitting side of the tubular part to be fitted to the tube body, an extending part formed by bending an outer end of the flat part at a substantially right angle towards the tubular part, a tapered part extending at an angle from an edge of the extending part so as to approach the tubular part, and a folded-back part folded back from an edge of the tapered part into a space enclosed by the tubular part, the flat part and the extending part. An edge of the folded-back part abuts on the tapered part so as to urge the tapered part outwards.

According to this, the flange of the flange tube is able to be produced by carrying out, for example, sheet metal working of press-forming to a tabular body or a plate member without cutting, thus achieving low manufacturing costs of the flange tube and excellent manufacturing efficiency thereof. The flange as a whole is not solid, unlike the flange formed by cutting a block member, and thus the flange part and the flange tube are light in weight. The space enclosed by the flat part, the extending part and the tapered part is not completely hollow and houses the folded-back part, and the edge of the folded-back part abuts on the tapered part so as to urge the tapered part outwards. This prevents a local recess or the like, ensures the accuracy required for the flat part and the tapered part of the flange of the flange tube, and enables to stably maintain the accuracy thereof. Accordingly, in the case where the flat parts of the flange tubes are made to abut on each other and are fastened by a band fastening tool or the like, the flat parts of the flanges of the flange tubes with improved accuracy allow less leakage of gas such as exhaust gas flowing through the flange tubes. Also, in the case where the flat parts of the flange tubes are fastened via a plate part of an interposition such as a plate part of a gasket formed in a ring shape or the like interposed therebetween, the same advantages are obtained.

In the tube end member according to the present invention, the folded-back part is formed so as to abut on the flat part.

According to this, the folded-back part is provided to abut on the flat part, and the edge of the folded-back part under the state abuts on the tapered part so as to urge the tapered part outwards. This reliably prevents a local recess or the like, more reliably ensures the accuracy required for the flat part and the tapered part of the flange of the flange tube, and enables to more stably maintain the accuracy thereof.

The flange tube according to the present invention includes a tube body, and the tubular part of the tube end member according to the present invention is fitted to at least one end of the tube body. The tubular part and the tube body are welded at a welded part on a fitted part. The welded part is separated from an edge part located at an endmost position of the tapered part of the tube end member in the fitting side to the tube body, by at least 20 mm in an axial direction of the tube body.

According to this, the arrangement of the welded part separated from the outer surface of the flat part of the tube end member by at least 20 mm in the axial direction of the tube body suppresses or prevents the influence of the heat in welding on the outer surface of the flat part serving as the flat surface of the flange, improves the accuracy in flatness of the flat part, and ensures the flatness of the flat part with required accuracy. The more preferable arrangement of the welded part separated from the outer surface of the flat part of the tube end member by at least 40 mm in the axial direction of the tube body reliably suppresses or prevents the influence of the heat in welding on the outer surface of the flat part serving as the flat surface of the flange, and more reliably ensures the flatness of the flat part with required high accuracy. The formation of the tube end member with a long tubular part by cutting requires long machining time and higher manufacturing costs. The tube end member according to the present invention is able to be formed without cutting, and accordingly the flange tube with the flat part excellent in the accuracy of flatness is able to be produced by processing in a short time at low costs.

The flange tube according to the present invention serves as an automobile component to be mounted on a vehicle.

According to this, the flange tube of light weight is used as an automobile component such as an exhaust tube, so that the fuel consumption performance of a vehicle is improved.

In the band joint structure for the flange tube according to the present invention, the flange tube according to the present invention is used as one flange tube and as the other flange tube. The flat part of the tube end member serving as one tube end member provided to the one flange tube is arranged so as to abut on the flat part of the tube end member serving as the other tube end member provided to the other flange tube, and a band fastening tool is attached to cover and fasten the extending part and the tapered part of the one tube end member and the extending part and the tapered part of the other tube end member.

According to this, the flat parts excellent in the accuracy of flatness are made to abut on each other and subjected to band fastening, thus achieving the band fastening while preventing or maximally suppressing a gap from being generated between the flange tubes. Moreover, the tapered parts of the flange tubes are also excellent in accuracy, and accordingly the band fastening having necessary strength, stability and durability is carried out reliably. In the case of fastening of flanges with a bolt and a nut, the fastening labor is increased. The band fastening requires less work labor and less work time in fastening the flange tubes. In an example, the workability is improved of the case where the joint structure for the flange tube is mounted on a vehicle. In particular, the usage of the flange tube formed in a cylindrical shape allows the band fastening even in any rotation state of the flange tube, and further enhances the workability.

The manufacturing method of the tube end member according to the present invention is to manufacture the tube end member according to the present invention. The manufacturing method includes the step of forming the flat part, the extending part, the tapered part and the folded-back part of the tube end member by squashing a curled part formed in a swirl-like shape at an end of a tubular intermediate member.

This ensures the formation of, by simple steps, the structure in which the outer peripheral surface of the folded-back part abuts on the flat part and the edge of the folded-back part abuts on the tapered part so as to urge the tapered part outwards.

The manufacturing method of the tube end member according to the present invention is to manufacture the tube end member according to the present invention. The manufacturing method includes the step of forming the flat part, the extending part, the tapered part and the folded-back part by sequentially carrying out press-forming to either of a tubular body and a tubular body formed from a plate.

According to this, the formation of the tube end member by press-forming enables to remarkably reduce the manufacturing costs of the tube end member and the flange tube and to improve the manufacturing efficiency thereof, in comparison with the case of manufacturing the tube end member by cutting. In particular, in the case where the flange tube is configured with the welded part separated from the edge part located at the endmost position of the tapered part of the tube end member in the fitting side to the tube body by at least 20 mm in the axial direction of the tube body, the flange tube with the flat part excellent in the accuracy of flatness is able to be produced by processing in a short time at very low costs.

Advantageous Effects of Invention

The present invention achieves low manufacturing costs, excellent manufacturing efficiency and light weight with regard to the flange tube, and further ensures the accuracy required for the flat part and the tapered part of the flange of the flange tube and achieves the maintenance of stable accuracy thereof.

BRIEF DESCRIPTION OF DRAWINGS

FIG. 1a is an oblique view of a tube end member of an embodiment according to the present invention; FIG. 1b is a longitudinal section view thereof; and FIG. 1c is a partial longitudinal section view illustrating the vicinity of a flat part and a tapered part thereof.

FIG. 2a is an oblique view of a part of a flange tube of the embodiment according to the present invention; FIG. 2b is a partial front section view thereof, and FIG. 2c is a partial section view illustrating the vicinity of the tube end member.

FIG. 4a-2 to FIG. 4c-2 are enlarged explanatory drawings illustrating the vicinity of the end in the flange side of an intermediate member of the tube end member subjected to the respective steps shown in FIG. 4a-1 to FIG. 4c-1.

FIG. 5d-1 to FIG. 5f-1 are explanatory drawings for describing the second half in the manufacturing steps of the tube end member of the embodiment; and FIG. 5d-2 to FIG. 5f-2 are enlarged explanatory drawings illustrating the vicinity of the end in the flange side of the intermediate member of the tube end member subjected to the respective steps shown in FIG. 5d-1 to FIG. 5f-1.

FIG. 9a is a partial oblique view of a part of a flange tube including an annular body of a cutting member of an embodiment according to the prior art; FIG. 9b is a longitudinal section view thereof; FIG. 9c is a partial longitudinal section view illustrating the vicinity of the annular body; and FIG. 9d is a sectional explanatory drawing illustrating a band joint structure for the flange tube shown in FIG. 9a.

FIG. 10a is a partial oblique view of a part of a flange tube including a flange formed by folding of an embodiment according to the prior art; FIG. 10b is a longitudinal section view thereof; FIG. 10c is a partial longitudinal section view illustrating the vicinity of the flange; and FIG. 10d is a sectional explanatory drawing illustrating a band joint structure for the flange tube shown in FIG. 10a.

DESCRIPTION OF EMBODIMENTS

[Tube End Member, Flange Tube, and Band Joint Structure for Flange Tube of Embodiment]

Figure 1:
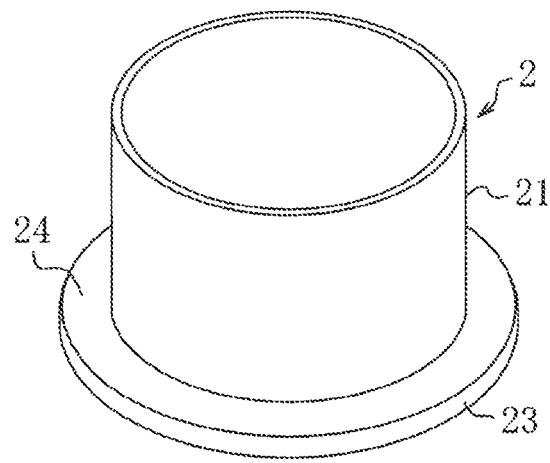
FIG. 4a-1 to FIG. 4c-1 are explanatory drawings for describing the first half in the manufacturing steps of the tube end member of the embodiment.
Figure 1:
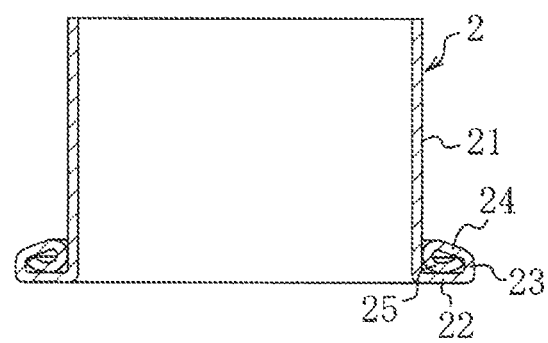
Figure 1:
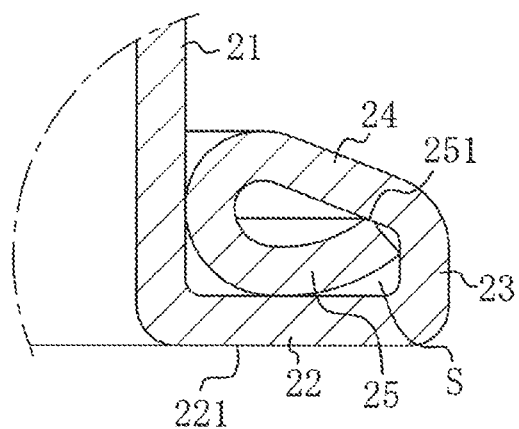
Figure 2:
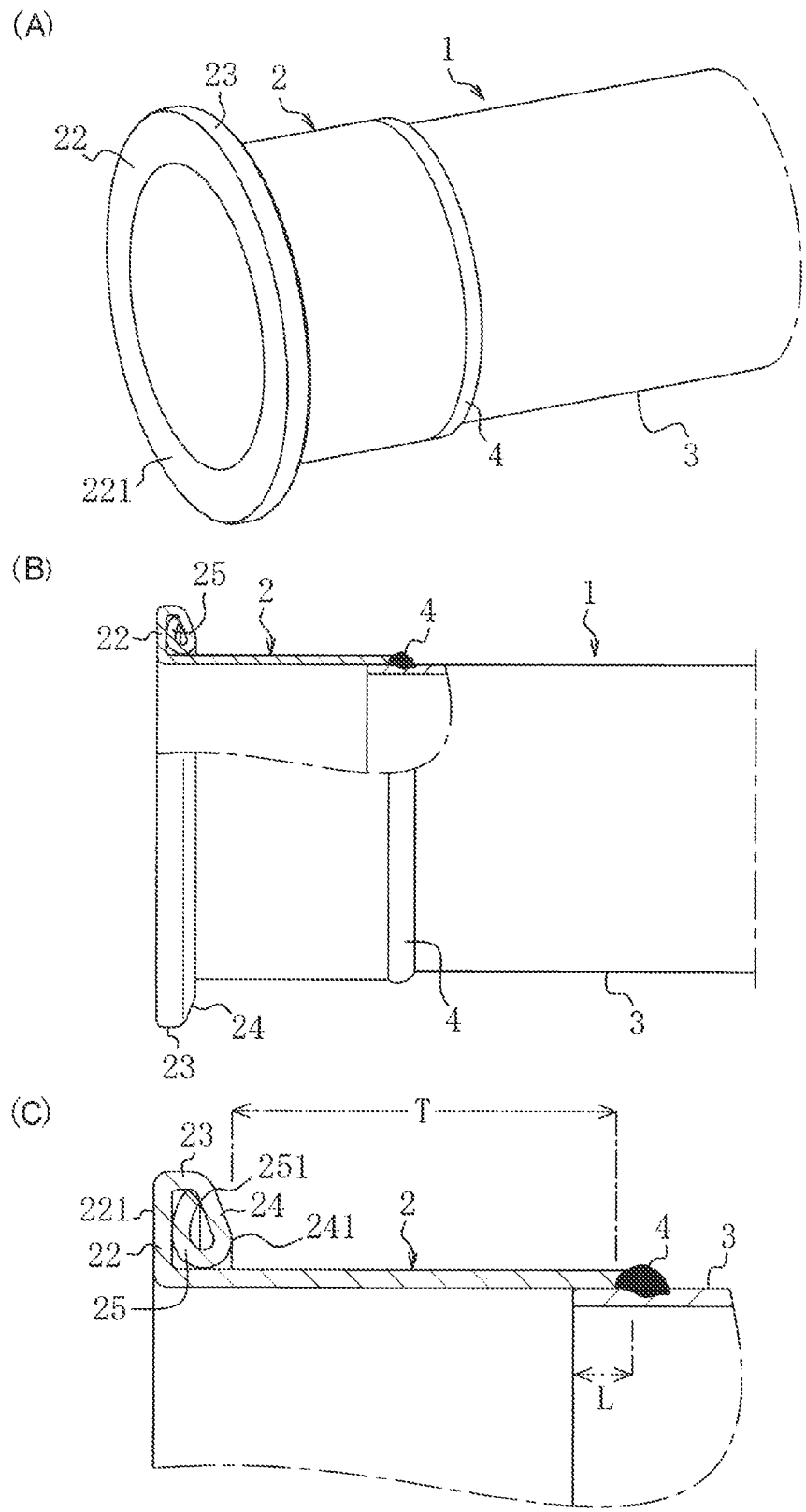
Figure 3:
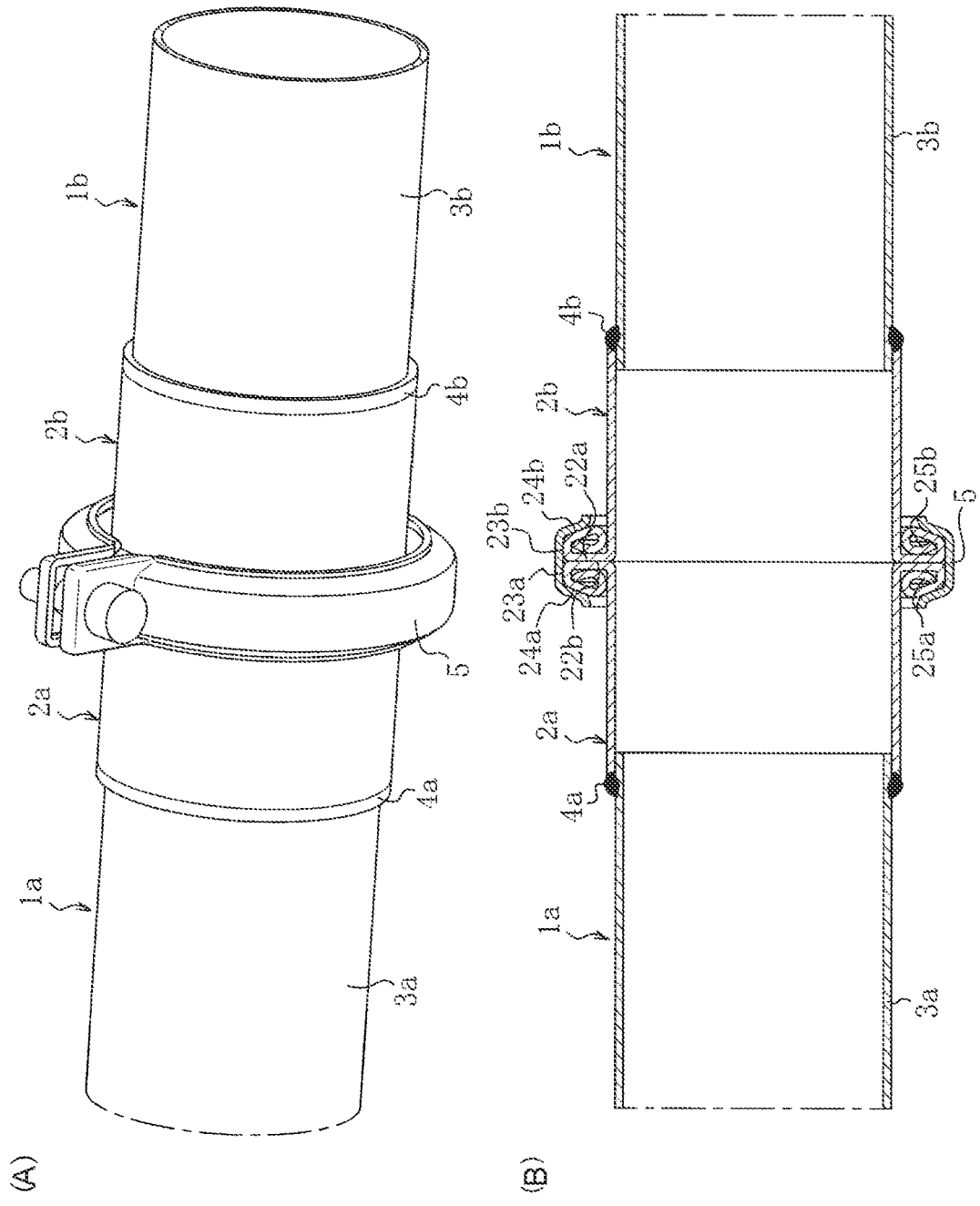
FIG. 3a is an oblique view of a band joint structure for the flange tube of the embodiment according to the present invention.
FIG. 3b is a longitudinal section view thereof.

As shown in FIG. 1 to FIG. 3, a tube end member 2 in the embodiment according to the present invention is provided at an end of a metal flange tube 1. The tube end member 2 in the present embodiment is provided at the ends of the both sides of the flange tube 1 so as to be fitted to the ends of the both sides of a tube body 3 to be described later. Alternatively, the tube end member 2 may be provided only at one side end of the flange tube 1 so as to be fitted only to one side end of the tube body 3. It is noted that the flange tube 1, the tube end member 2, and a band joint structure for the flange tubes 1, 1 to be described later are preferably used as automobile components to be mounted on a vehicle, for example, an exhaust tube for a vehicle, and is also available as components in an appropriate field within a usable range, such as water tube.

The tube end member 2 is made of metal and has a tubular part 21. The tubular part 21 is formed so as to be fitted to the ends of the tube body 3 of the flange tube 1. The tubular part 21 in the present embodiment is formed in a cylindrical shape, and has the inner diameter slightly larger than the outer diameter of the cylindrical tube body 3 so as to be fitted externally on the tube body 3. The tube end member 2 has a flat part 22 formed by bending the end of the tubular part 21 outwards at a substantially right angle in the opposite side to the fitting side to the tube body 3. The flat part 22 has an outer surface 221 which is positioned outside in the axial direction of the tubular part 21 and serves as a flat surface excellent in flatness. The flat surface of the outer surface 221 preferably has a flatness with a difference in height of no more than 0.1 mm, more preferably with a difference in height of no more than 0.053 mm. It is noted that since the flat surface of the outer surface 221 most preferably has a flatness of 0 mm, the flatness shall be 0 mm to 0.1 mm, more preferably 0 mm to 0.053 mm, or shall be over 0 mm to no more than 0.1 mm, more preferably over 0 mm to no more than 0.053 mm.

The tube end member 2 has an extending part 23 which is formed by bending the outer end of the flat part 22 at a substantially right angle towards the tubular part 21, and has a tapered part 24 which extends at an angle from the edge of the extending part 23 so as to approach the tubular part 21. The tube end member 2 further has a folded-back part 25 which is folded back from the edge of the tapered part 24 into a space S enclosed by the tubular part 21, the flat part 22 and the extending part 23.

The folded-back part 25 is bended and rounded from the edge of the tapered part 24 towards the space S so that the outer peripheral surface of the folded-back part 25 abuts on the flat part 22, more preferably so that the outer peripheral surface abuts on the tubular part 21 and the flat part 22. The folded-back part 25 is provided in the space S, and the edge of the folded-back part 25 abuts on the tapered part 24 at an abutting part 251 so as to urge the tapered part 24 outwards.

In the flange tube 1 configured with the tube end member 2 and the tube body 3, the tubular part 21 of the tube end member 2 is fitted externally on the end of the metal tube body 3, so that a fitting portion L is provided, in which the end of the tube body 3 and the tubular part 21 overlap each other. The tubular part 21 of the tube end member 2 and the tube body 3 are connected by welding at a welded part 4 formed on the fitting portion L or formed so as to include the fitting portion L. In the present embodiment, the tubular part 21 and the tube body 3 are welded at the circumferential welded part 4 formed so as to include a part of the fitting portion L, and the labor in welding is reduced. In the illustrated example, the edge of the tubular part 21 and the tube body 3 are welded by lap fillet welding at the welded part 4. The tubular part 21 and the tube body 3 may be welded at an appropriate welded part, for example, a welded part provided by caring out piercing welding circumferentially in a predetermined width range in the length direction of the overlapped fitting portion L. An appropriate welding method is available, such as laser beam welding, seam welding, and arc welding.

In order to avoid the decrease in flatness of the outer surface 221 of the flat part 22 influenced by the heat in welding, the welded part 4 which connects the tubular part 21 and the tube body 3 of the flange tube 1 is preferably provided at a position separated by 20 mm or more in the axial direction of the tube body 3 from an edge part 241 located at the endmost position of the tapered part 24 of the tube end member 2 in the fitting side to the tube body 3, more preferably provided at a position separated by 40 mm or more in the axial direction of the tube body 3 from the edge part 241 located at the endmost position of the tapered part 24 in the fitting side to the tube body 3. With respect to the separated positional relation, FIG. 2 shows a separated distance T as the distance between the welded part 4 and the edge part 241 located at the endmost position of the tapered part 24 of the tube end member 2 in the fitting side to the tube body 3. The separated distance T is the distance between the edge part 241 located at the endmost position of the tapered part 24 of the tube end member 2 in the fitting side to the tube body 3 and the position of the welded part 4 closest to the outer surface 221.

The flange tubes 1 are connected to each other by, for example, the band joint structure shown in FIG. 3. In the band joint structure shown in FIG. 3, the flange tube 1 is used as a flange tube 1a serving as one flange tube and a flange tube 1b serving as the other flange tube. A flat part 22a of a tube end member 2a serving as one tube end member included in the one flange tube 1a, and a flat part 22b of a tube end member 2b serving as the other tube end member included in the other flange tube 1b are arranged so as to abut on each other. The flange tube 1a and the flange tube 1b are fastened by a band fastening tool 5 which is formed in a substantially mountain shape in a sectional view and arranged so as to cover an extending part 23a of the one tube end member 2a and a tapered part 24a urged by a folded-back part 25a, and an extending part 23b of the other tube end member 2b and a tapered part 24b urged by a folded-back part 25b. In the band joint structure where the flange tubes 1a, 1b are fastened by the band fastening tool 5, the one flange tube 1a including a tube body 3a and the tube end member 2a welded to each other at a welded part 4a communicates with the other flange tube 1b including a tube body 3b and the tube end member 2b welded to each other at a welded part 4b, thereby allowing appropriate fluid such as gas or water to pass through the communicating flange tubes 1a, 1b.

Figure 4:
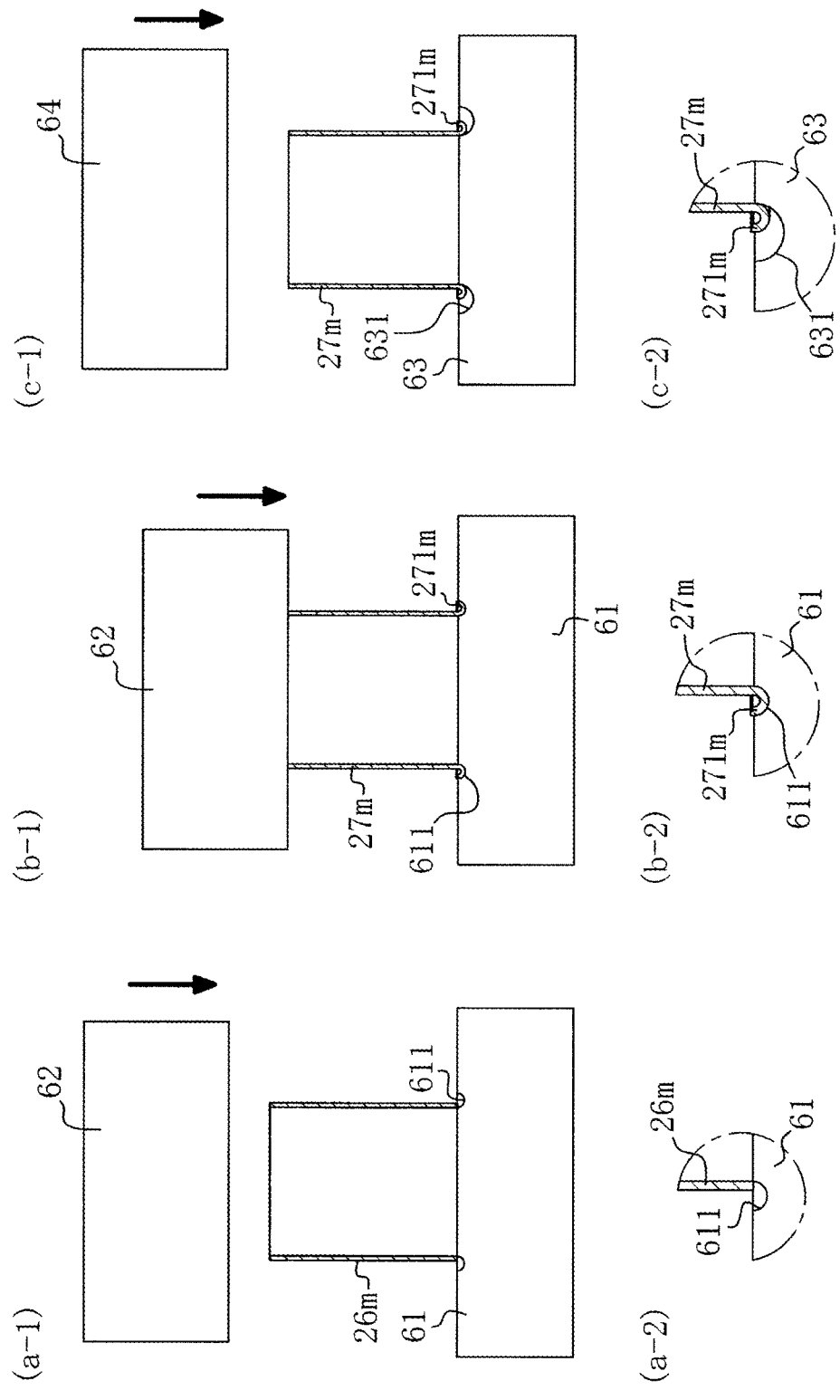
Figure 5:
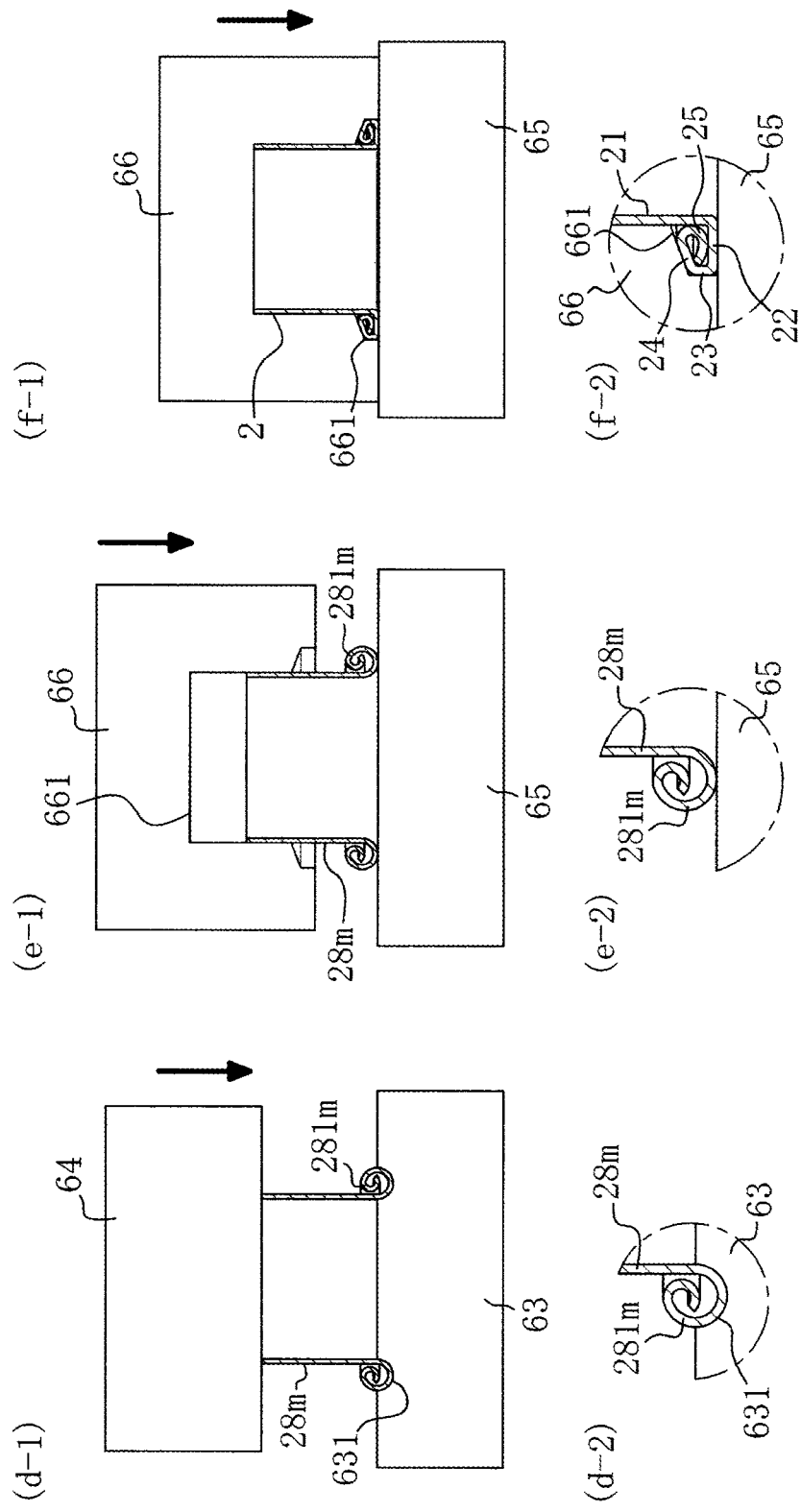

An example of the manufacturing steps of the tube end member 2 of the present embodiment is described next (refer to FIG. 4 and FIG. 5). In the manufacturing of the tube end member 2 by the manufacturing steps of the example shown in FIG. 4 and FIG. 5, a tubular body 26m formed in a cylindrical shape is used. The tubular body 26m may be made of appropriate metal material, for example, iron, stainless steel, titanium or aluminum. The tubular body 26m is arranged on a lower die 61 including a circumferential groove 611 formed in a substantially arc shape in a sectional view so that the lower end of the tubular body 26m is located in the inner side of the groove 611. As shown by the thick line arrows in the figures, the tubular body 26m is pressed to be press-formed toward the lower die 61 by an upper die 62, whereby a tubular body 27m is formed serving as an intermediate member having a curled part 271m at the lower end thereof bended outwards in an arc shape (refer to FIG. 4a-1, FIG. 4a-2, FIG. 4b-1, and FIG. 4b-2).

The tubular body 27m is thereafter placed on a lower die 63 including a circumferential groove 631 formed in a substantially arc shape in a sectional view to be larger in diameter than the groove 611 so that the curled part 271m of the tubular body 27m is located in the inner side of the groove 631. As shown by the thick line arrows in the figures, the tubular body 27m is pressed to be press-formed toward the lower die 63 by an upper die 64, whereby a tubular body 28m is formed serving as a tubular intermediate member having a curled part 281m at the lower end thereof bended outwards in a swirl-like arc shape (refer to FIG. 4c-1, FIG. 4c-2, FIG. 5d-1, and FIG. 5d-2).

The tubular body 28m is thereafter placed on the plane surface of a lower die 65 so that the curled part 281m is positioned at the edge part in the lower side, and is pressed to be press-formed toward the lower die 65 by an upper die 66, whereby the tube end member 2 is formed. The upper die 66 includes a recess part 661 having a shape substantially corresponding to the outer shapes of the tubular part 21, the tapered part 24 and the extending part 23 of the tube end member 2. As shown by the thick line arrows in the figures, the tubular body 28m is pressed into the recess part 661 to be press-formed, and the curled part 281m formed in a swirl-like shape is squashed, whereby the flat part 22, the extending part 23, the tapered part 24 and the folded-back part 25 of the tube end member 2 are formed (refer to FIG. 5e-1, FIG. 5e-2, FIG. 5f-1, and FIG. 5f-2). The formation by squashing of the swirl-like curled part 281m ensures the formation of, by simple steps, the structure in which the outer peripheral surface of the folded-back part 25 abuts on the flat part 22 and the edge of the folded-back part 25 abuts on the tapered part 24 so as to urge the tapered part 24 outwards.

Figure 6:
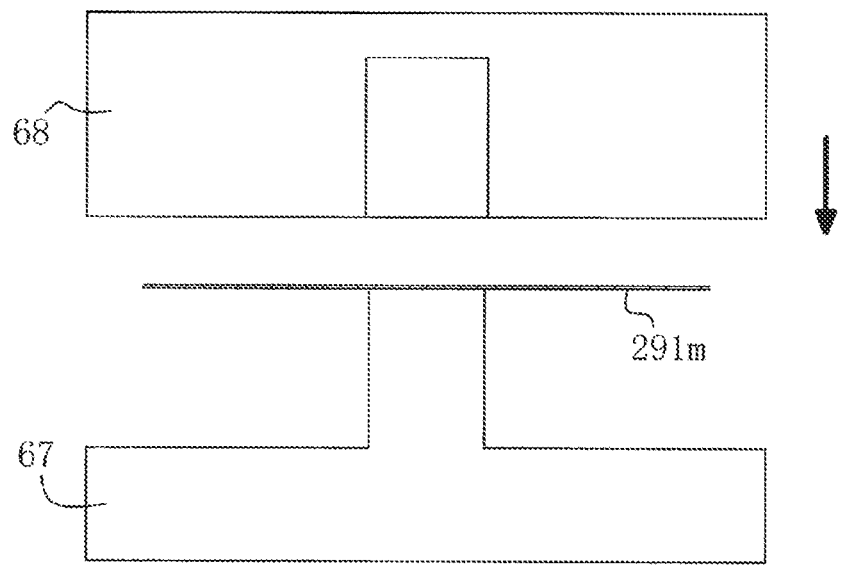
FIG. 6a to FIG. 6d are explanatory drawings for describing the manufacturing steps of producing the intermediate member of the tube end member from a metal plate.
Figure 6:
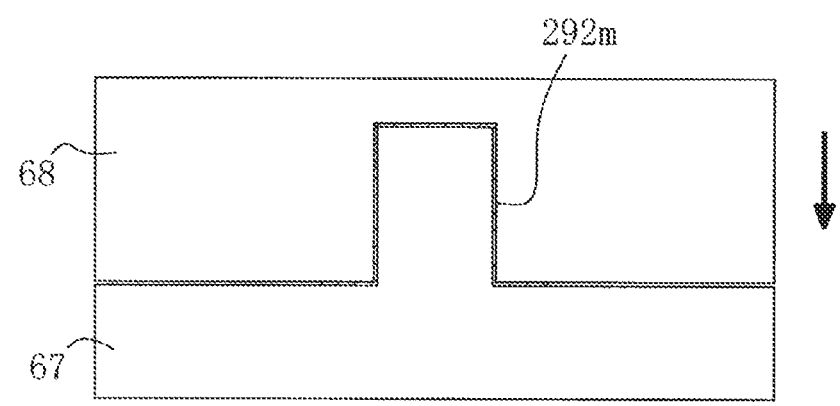
Figure 6:
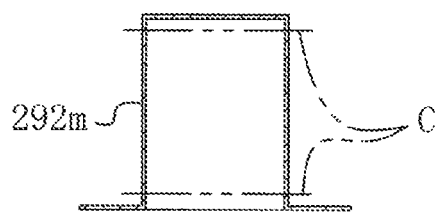
Figure 6:
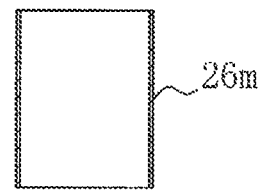

In the example of the manufacturing steps described above, the tubular body 26m formed in a cylindrical shape serves as a starting member. Alternatively, as shown in FIG. 6, the tube end member 2 may be formed by carrying out press-forming to a metal plate 291m of a plate member with a lower die 67 and an upper die 68 (refer to the thick line arrows shown in FIG. 6) to form a bottomed cylindrical intermediate member 292m having a flange, and cutting down the intermediate member 292m along cutting lines C of the flange side and the bottom side to form the tubular body 26m, and thereafter carrying out the steps in the above example of the manufacturing steps to the tubular body 26m. In this case also, the metal plate 291m may be made of appropriate metal material, for example, iron, stainless steel, titanium or aluminum.

According to the present embodiment, the flange of the flange tube 1 is configured with the flat part 22, the extending part 23, the tapered part 24 and the folded-back part 25, and is produced by carrying out sheet metal working of press-forming to a tubular body or a plate member without cutting, thus achieving low manufacturing costs of the flange tube 1 and excellent manufacturing efficiency thereof. In the tube end member 2 or the flange tube 1, the flange as a whole is not solid, unlike the flange formed by cutting a block member, and thus the flange part and the flange tube 1 are light in weight. It is noted that in one example of a member formed by cutting into the same shape and size as the tube end member 2, the cut member weighs 95.48 gram, while the tube end member 2 weighs 75.91 gram, resulting in achieving reduction in weight by approx. 20% to 21%.

The space enclosed by the flat part 22, the extending part 23 and the tapered part 24 is not completely hollow and houses the folded-back part 25, and the edge of the folded-back part 25 abuts on the tapered part 24 so as to urge the tapered part 24 outwards. This prevents a local recess or the like, ensures the accuracy in flatness and the like required for the flat part 22 and the accuracy of an inclined surface state of the angle required for the tapered part 24 and the allowable deformation of the inclined surface with respect to the flange of the flange tube 1, and achieves the maintenance of the stable accuracy thereof. In particular, the abutting of the folded-back part 25 on the flat part 22, more preferably, the abutting of the folded-back part 25 on the tubular part 21 and the flat part 22, ensures more reliably the accuracy required for the flat part 22 and the tapered part 24 of the flange of the flange tube 1, and achieves the maintenance of the stabler accuracy thereof.

The welded part 4 is configured to be separated from the edge part 241 located at the endmost position of the tapered part 24 of the tube end member 2 in the fitting side to the tube body 3, by 20 mm or more, more preferably 40 mm or more, in the axial direction of the tube body 3. The configuration suppresses or prevents the influence of the heat in welding on the outer surface 221 of the flat part 22 serving as the flat surface of the flange, and the deformation of the outer surface 221 of the flat part 22, thereby enabling to improve the accuracy in flatness of the flat part 22, and to ensure the flatness of the flat part 22 with required accuracy or the flatness of the outer surface 221 of the flat part 22. In the case where a tube end member with a long tubular part is formed by cutting, the machining time is long and the manufacturing costs are high. The tube end member 2 is able to be formed by press-forming without cutting, and this allows to produce the flange tube 1 with the flat part 22 excellent in the accuracy of flatness by the processing in a short time at very low costs.

In the case where the flange tube 1, the tube end member 2, or the band joint structure for the flange tubes 1, 1 is used as an automobile component to be mounted on a vehicle, the flange tube 1 of light weight is available as an automobile component such as an exhaust tube, so that the fuel consumption performance of a vehicle is improved.

In the band joint structure for the flange tubes 1, 1, the flat parts 22, 22 or the outer surfaces 221, 221 excellent in the accuracy of flatness are made to abut on each other and subjected to band fastening, thus achieving the band fastening while preventing or maximally suppressing a gap from being generated between the flange tubes 1. Moreover, the tapered parts 24 of the flange tubes 1 are also excellent in accuracy, and accordingly the band fastening having necessary strength, stability and durability is carried out reliably. In the case of fastening of flanges with a bolt and a nut, the fastening labor of aligning holes of the flanges and the like is increased. On the other hand, the band fastening requires less work labor and less work time in fastening the flange tubes 1, 1. In an example, the workability is improved of the case where the joint structure for the flange tube 1 is mounted on a vehicle. In particular, the usage of the flange tube 1 formed in a cylindrical shape allows the band fastening even in any rotation state of the flange tube 1, and further enhances the workability.

[Measurement Results of Flatness of Flat Part of Flange Tube]

Figure 7:
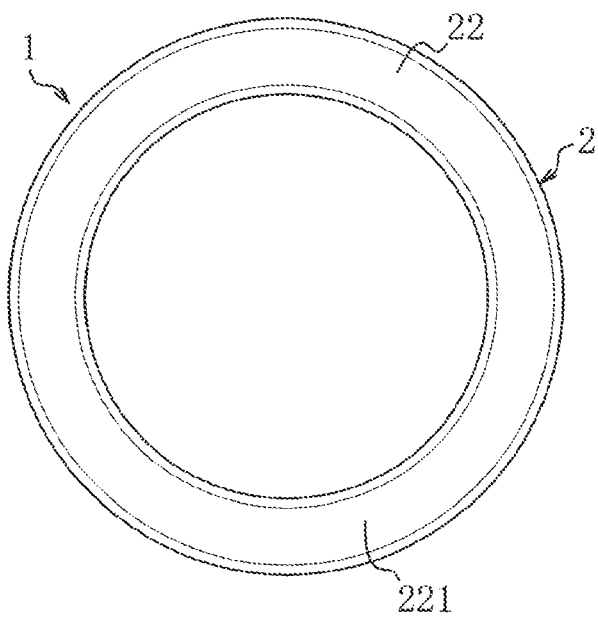
FIG. 7a is a drawing of the flange tube of the embodiment viewed from the flat part side.
FIG. 7b is a schematic explanatory drawing for describing measurement of flatness of the flat part of the flange tube.
Figure 7:
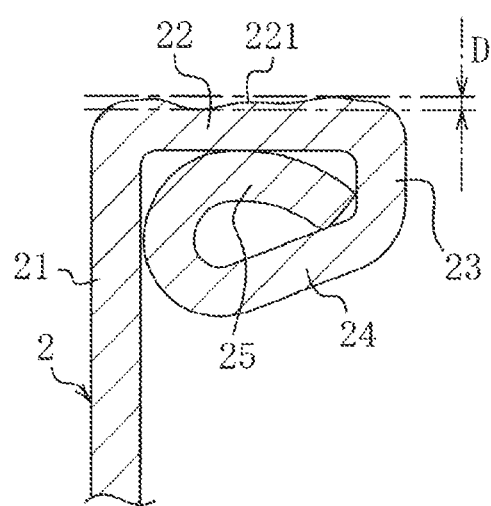
Figure 8:
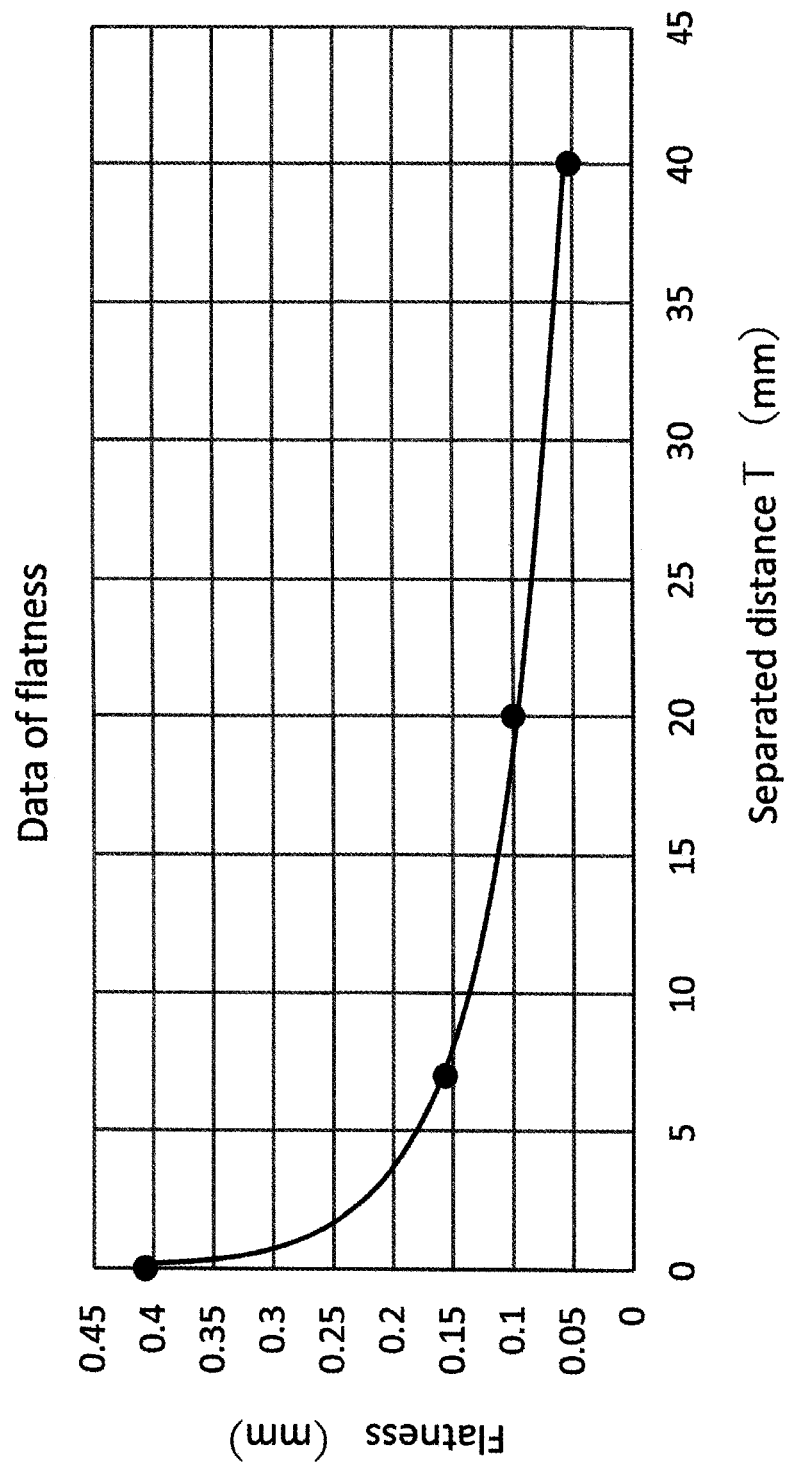
FIG. 8 is a graph indicating relation between length from the flat part to a welded part and flatness of the flat part in the flange tube of the embodiment.
Figure 9:
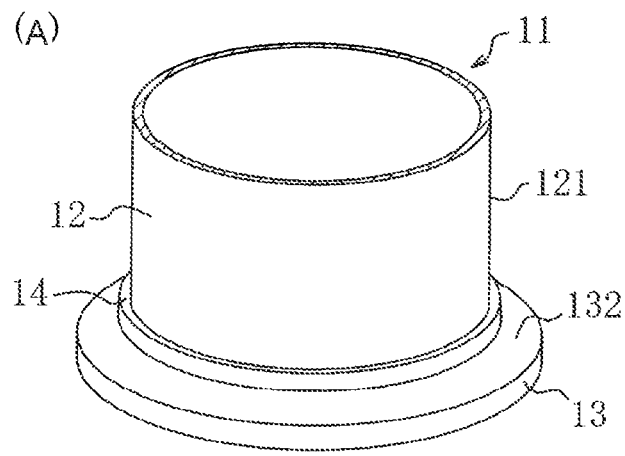
Figure 9:
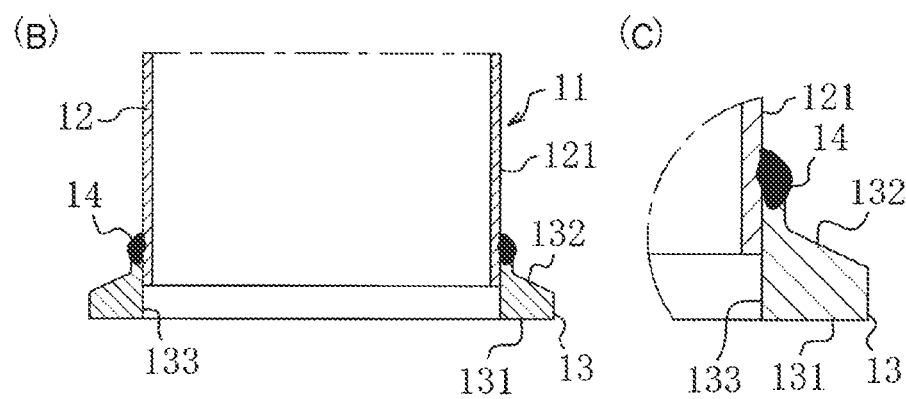
Figure 9:
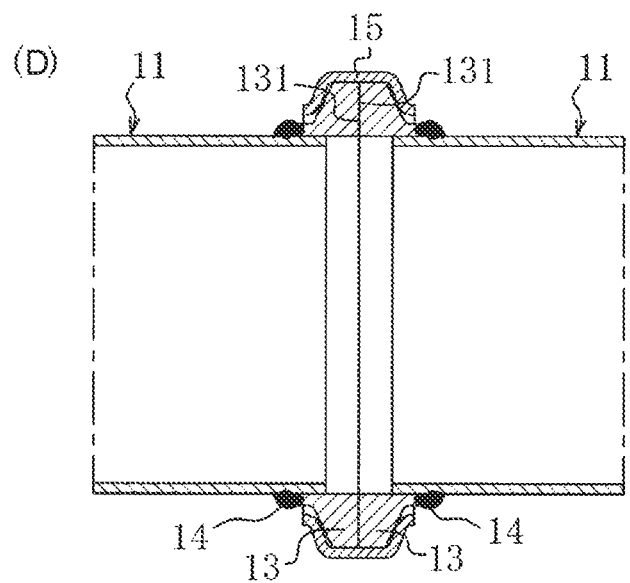
Figure 10:
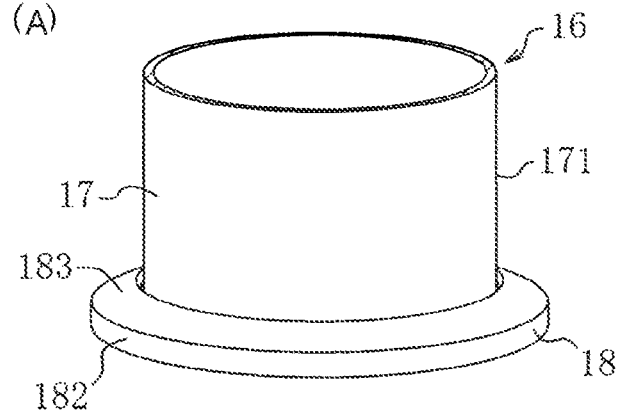
Figure 10:
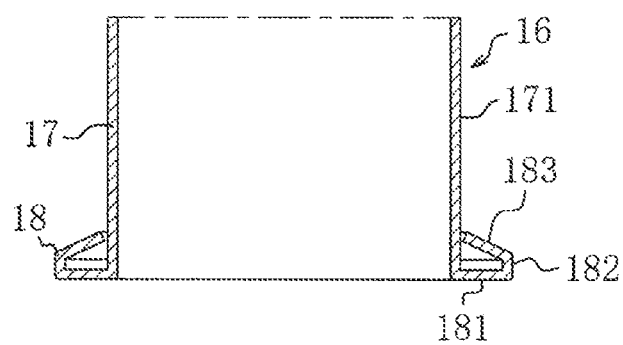
Figure 10:
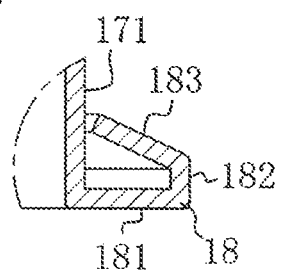
Figure 10:
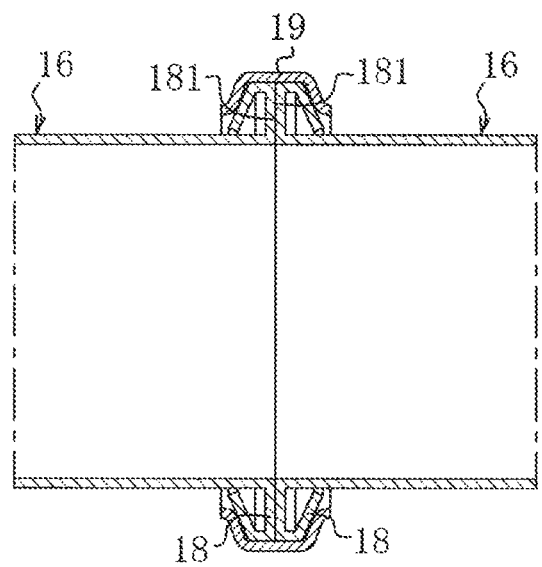

According to the configuration of the flange tube 1 of the above embodiment, FIG. 8 shows the measurement results of flatness of the outer surface 221 of the flat surface 22 by variously changing the separated distance T between the welded part 4 and the edge part 241 located at the endmost position of the tapered part 24 of the tube end member 2 in the fitting side to the tube body 3. With respect to the flatness of the outer surface 221 of the flat part 22 in the flange tube 1, a height difference D of the outer surface 221 of the flat part 22 is measured at an arbitrary cross section except for the bended part between the tubular part 21 and the flat part 22 and the bended part between the flat part 22 and the extending part 23 as shown in FIG. 7*b*, over the entire circumference of the outer surface 221 of the flat part 22 shown in FIG. 7*a*. The obtained maximum height difference D is treated as the flatness.

In the measurement, the separated distance T between the welded part 4 and the edge part 241 located at the endmost position of the tapered part 24 of the tube end member 2 in the fitting side to the tube body 3 is variously set to 0 mm, 7 mm, 20 mm and 40 mm. In the case where the separated distance T is 0 mm, the tubular part 21 is formed to have the length up to the edge part 241 in the axial direction thereof and is fitted to the tube body 3, and the welded part 4 is formed. In the case where the separated distance T is 7 mm or 20 mm, the tubular part 21 of the tube end member 2 is formed to have a length in the axial direction thereof shorter by a corresponding length than the length in the axial direction of the tubular part 21 of the tube end member 2 of the case where the separated distance T is 40 mm.

In the case where the separated distance T is variously set to 0 mm, 7 mm, 20 mm and 40 mm, the flatness of the measurement results is 0.407 mm, 0.157 mm, 0.100 mm and 0.0530 mm, respectively (refer to FIG. 8). From the viewpoint of the practicality of the flange tube 1 and the band joint structure for the flange tube 1, the gap between the flange tubes 1, 1 shall fall within a practically acceptable range, and thus, in a preferable configuration, the separated distance T is 20 mm or more and the flatness is 0.100 mm or less, in a more preferable configuration, the separated distance T is 40 mm or more and the flatness is 0.0530 mm or less. FIG. 8 reveals that in the case where the separated distance T is shorter than 7 mm, the flatness is lowered suddenly. Accordingly, the separated distance T shall be 7 mm or more.

[Scope of Invention Disclosed Herein]

The invention disclosed herein includes not only the respective aspects described as the invention and the embodiments, but also, within the applicable range, the aspect specified by changing some contents disclosed herein to other contents disclosed herein, the aspect specified by adding other contents disclosed herein to the contents disclosed herein, and the aspect specified by deleting some contents disclosed herein to the limit allowing to produce partial effects so as to make generic concept. The invention disclosed herein includes the modifications and additions to be described below.

The flange tube 1, the tube end member 2 and the tube body 3 of the above embodiment have been described by use of the examples of the flange tube 1, the tube end member 2 and the tube body 3 respectively formed in cylindrical shapes. Alternatively, in an example, the flange tube 1, the tube end member 2 and the tube body 3 may be formed in appropriate tubular shapes. The flange tube 1, the tube end member 2 and the tube body 3 may be of, for example, substantially elliptic shapes in a sectional view, substantially race-track shapes in a sectional view, or substantially polygonal shapes in a sectional view.

The tube end member 2 is able to be formed from the tubular body 26*m* formed in an appropriate cylindrical shape. In the case of the tubular body 26*m* of a welded tube, the tubular body 26*m* has some disadvantages, for example, risk of exhaust leakage caused by a step gap even of less than 0.1 mm at the welded part, degradation in roundness caused by the heat in welding in the case of the tube end member 2 formed in a cylindrical shape, and need of the facility for forming a welded tube. Accordingly, the tubular body 26*m* is preferably of a seamless tube without any joint in the axial direction.

INDUSTRIAL APPLICABILITY

The present invention is applicable to, for example, a tube structure to be mounted in a vehicle, and a tube structure to be installed in housing or urban infrastructure.

REFERENCE SIGNS LIST

1, 1*a*, 1*b*: FLANGE TUBE
2, 2*a*, 2*b*: TUBE END MEMBER
21: TUBULAR PART
22, 22*a*, 22*b*: FLAT PART

221: OUTER SURFACE
23, 23a, 23b: EXTENDING PART
24, 24a, 24b: TAPERED PART
241: EDGE
25, 25a, 25b: FOLDED-BACK PART
251: ABUTTING PART
26m, 27m, 28m: TUBULAR BODY
271m, 281m: CURLED PART
291m: PLATE
292m: INTERMEDIATE MEMBER
3, 3a, 3b: TUBE BODY
4, 4a, 4b: WELDED PART
5: BAND FASTENING TOOL
61, 63, 65, 67: LOWER DIE
611, 631: GROOVE
62, 64, 66, 68: UPPER DIE
661: RECESS PART
S: SPACE ENCLOSED BY TUBULAR PART, FLAT PART AND EXTENDING PART
L: FITTING PORTION WHERE TUBE BODY AND TUBULAR PART OVERLAP EACH OTHER
T: SEPARATED DISTANCE BETWEEN WELDED PART AND EDGE LOCATED AT ENDMOST POSITION OF TAPERED PART OF TUBE END MEMBER IN FITTING SIDE TO TUBE BODY
C: CUTTING LINE
D: HEIGHT DIFFERENCE
11: FLANGE TUBE
12: TUBE BODY
121: OUTER PERIPHERAL SURFACE
13: ANNULAR BODY
131: FLAT SURFACE
132: TAPERED SURFACE
133: INNER PERIPHERAL SURFACE
14: WELDED PART
15: BAND FASTENING TOOL
16: FLANGE TUBE
17: TUBE BODY
171: OUTER PERIPHERAL SURFACE
18: FLANGE
181: FLAT PART
182: EXTENDING PART
183: TAPERED PART
19: BAND FASTENING TOOL

The invention claimed is:

1. A tube end member to be provided at an end of a flange tube, the tube end member comprising:
a tubular part configured to be fitted to an end of a tube body of the flange tube;
a flat part formed by bending an end of the tubular part outwards at a substantially right angle, in an opposite side to a fitting side of the tubular part to be fitted to the tube body;
an extending part formed by bending an outer end of the flat part at a substantially right angle towards the tubular part;
a tapered part extending at an angle from an edge of the extending part so as to approach the tubular part; and
a folded-back part folded back from an edge of the tapered part into a space enclosed by the tubular part, the flat part and the extending part, wherein
an edge of the folded-back part abuts on the tapered part so as to urge the tapered part outwards,
wherein the extending part has a flat surface.

2. The tube end member according to claim 1, wherein the folded-back part is formed so as to abut on the flat part.

3. A flange tube comprising:
the tube end member according to claim;
wherein the tubular part is fitted to one end of the tube body,
the tubular part and the tube body are welded at a welded part on a fitted part, and
the welded part is separated from an edge located at an endmost position of the tapered part of the tube end member in the fitting side to the tube body, by at least 20 mm in an axial direction of the tube body.

4. The flange tube according to claim 3, wherein the flange tube serving as an automobile component to be mounted on a vehicle.

5. A band joint structure comprises the flange tube according to claim 3,
wherein
the flange tube is both a first flange tube and a second flange tube,
the flat part of the tube end member serving as one tube end member provided to the first flange tube is arranged so as to abut on the flat part of the tube end member serving as the other tube end member provided to the second flange tube, and
a band fastening tool is attached to cover and fasten the extending part, the tapered part of the one tube end member, the extending part, and the tapered part of the other tube end member.

6. A manufacturing method of the tube end member according to claim 2, the manufacturing method comprising the step of:
forming the flat part, the extending part, the tapered part and the folded-back part of the tube end member by squashing a curled part formed in a swirl shape at an end of a tubular intermediate member.

7. A manufacturing method of the tube end member according to claim 1, the manufacturing method comprising the step of:
forming the flat part, the extending part, the tapered part and the folded-back part by sequentially carrying out press-forming to either of a tabular body formed from a plate and a tubular body.

* * * * *